(12) United States Patent
Hue et al.

(10) Patent No.: US 9,676,324 B2
(45) Date of Patent: Jun. 13, 2017

(54) DRIVING ASSISTANCE METHOD AND DEVICE

(71) Applicant: Valeo Vision, Bobigny (FR)

(72) Inventors: David Hue, Butry sur Oise (FR); Hafid El Idrissi, Pantin (FR); Etienne Monchy, Herblay (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/022,687

(22) PCT Filed: Sep. 25, 2014

(86) PCT No.: PCT/EP2014/070514
§ 371 (c)(1),
(2) Date: Mar. 17, 2016

(87) PCT Pub. No.: WO2015/044283
PCT Pub. Date: Apr. 2, 2015

(65) Prior Publication Data
US 2016/0207452 A1    Jul. 21, 2016

(30) Foreign Application Priority Data
Sep. 26, 2013 (FR) ..................... 13 59266

(51) Int. Cl.
*B60Q 1/26* (2006.01)
*B60J 3/04* (2006.01)
*B60J 3/06* (2006.01)
*B60Q 1/50* (2006.01)
*B60Q 1/14* (2006.01)

(52) U.S. Cl.
CPC ...... *B60Q 1/50* (2013.01); *B60J 3/04* (2013.01); *B60Q 1/2661* (2013.01); *B60Q 1/1423* (2013.01); *Y02T 10/88* (2013.01)

(58) Field of Classification Search
None
See application file for complete search history.

(56) References Cited

U.S. PATENT DOCUMENTS 4,286,308 A * 8/1981 Wolff ............... F21S 48/1136
                                                362/19
5,486,938 A * 1/1996 Aigrain ................ B60Q 1/14
                                                349/116

FOREIGN PATENT DOCUMENTS

| DE | 2001086 | 7/1971 |
| DE | 3836095 A1 | 4/1990 |
| EP | 0945303 A1 | 9/1999 |

* cited by examiner

*Primary Examiner* — Dedei K Hammond
(74) *Attorney, Agent, or Firm* — Jacox, Meckstroth & Jenkins

(57) ABSTRACT

A device for assisting with driving an automotive vehicle, the vehicle being equipped with at least one illuminating device able to emit a beam for illuminating a road scene (SR) in front of the vehicle, the assisting device comprising a variable transmission screen that is intended to be placed between the road scene (SR) and a driver of the vehicle, the assisting device being configured to, when active, synchronously control a light emission of at least one light source of the illuminating device and a transmission coefficient of the variable transmission screen with a pulsed signal. The assisting device is configured so as to prevent antiphase and/or phase effects while and if a vehicle equipped with a device of the same type is approaching.

20 Claims, 2 Drawing Sheets

DRIVING ASSISTANCE METHOD AND DEVICE

CROSS-REFERENCE TO RELATED APPLICATIONS

This application is the U.S. National Phase application of PCT Application No. PCT/EP2014/070514 filed Sep. 25, 2014, which claims priority to the French application 1359266 filed on Sep. 26, 2013, which applications are incorporated herein by reference and made a part hereof.

BACKGROUND OF THE INVENTION

1. Field of the Invention

The invention relates to a device for assisting with driving an automotive vehicle. The invention also relates to a method for assisting with driving an automotive vehicle.

2. Description of the Related Art

The present invention relates to methods and devices that are intended to provide assistance with driving automotive vehicles, particularly when exterior luminosity is low and requires lights to be turned on.

The light beams emitted by the illuminating devices with which vehicles are equipped are regulated by international regulations that set maximum and minimum allowable intensities, for example on a screen placed away from and on the axis of the illuminating device. These regulations have the aim of simultaneously:
- providing the driver of the vehicle equipped with the illuminating device with a satisfactory illumination of the road scene toward which he is driving, so that he is able to apprehend his environment under the best possible conditions, and
- ensuring that drivers of other vehicles are not dazzled, whether they are driving in the opposite direction (approaching vehicles) or in the same direction (vehicles in front).

With the aim of meeting these regulatory aims and with a view to improving the comfort and safety of the driver, a plurality of solutions have been proposed. One thereof consists in using a device for assisting with driving composed of a pulsed illumination source synchronized with a variable transmission screen, in such a way that the illumination reaches its maximum value when the transmission coefficient of the screen reaches its maximum value, i.e. a maximum transparency, and in such a way that the illumination reaches its minimum value when the transmission coefficient of the variable transmission screen reaches its minimum value, i.e. a minimum transparency.

Thus, by virtue of this synchronization, the driver benefits completely from his lights, while decreasing the risk of being dazzled by exterior light sources, because the vision of the driver is greatly restricted when the transparency of the variable transmission screen is at its minimum.

Furthermore, the pulsed illumination does not dazzle the drivers of other vehicles since they perceive only an average illumination that is set to meet the aforementioned regulations.

Particular problems arise when the vehicle equipped with the device described above meets an approaching vehicle equipped with a device of the same type. In particular:
- When the two vehicles are in antiphase, i.e. when the transmission coefficient of the variable transmission screen of the vehicle is at its minimum while the lights of the other vehicle are emitting light, the driver is unable to see (or is able to see but not as well) the lights of the other vehicle.
- When the two vehicles are in phase, i.e. when their lights emit light at the same time and the transmission coefficients of their variable transmission screens are at their maximum at the same time, the drivers may be discomforted by the lights of the other vehicle.

SUMMARY OF THE INVENTION

The invention aims to mitigate at least some of the drawbacks of these known devices for assisting with driving.

To do this, the invention relates to a device for assisting with driving an automotive vehicle, the vehicle being equipped with at least one illuminating device able to emit a beam for illuminating a road scene in front of the vehicle, the assisting device comprising a variable transmission screen that is intended to be placed between the road scene and a driver of the vehicle, the assisting device being configured to, when active, synchronously control a light emission of at least one light source of the illuminating device and a transmission coefficient of the variable transmission screen with a pulsed signal, wherein the assisting device is configured to continuously modify the pulsed signal, while the device is active, so as to prevent antiphase and/or phase effects while and if a vehicle equipped with a device of the same type is approaching.

The expression "continuously modify the pulsed signal" is understood to mean that the pulsed signal is modified sufficiently often, i.e. not necessarily 100% of the time, that if an antiphase and/or phase effect were to appear, the time between two modifications would be short enough that the driver of the vehicle would not perceive this effect visually. From the point of view of the driver, this effectively means that the effect does not occur.

The expression "device of the same type" is understood to mean a device for assisting with driving an automotive vehicle, the vehicle being equipped with at least one illuminating device able to emit a beam for illuminating a road scene in front of the vehicle, the assisting device comprising a variable transmission screen that is intended to be placed between the road scene and a driver of the vehicle, the assisting device being configured to, when active, synchronously control a light emission of at least one light source of the illuminating device and a transmission coefficient of the variable transmission screen with a pulsed signal, which will possibly be the same as that of the first vehicle.

A device according to the invention therefore makes it possible to prevent antiphase and phase effects by modifying the pulsed signal whether a vehicle equipped with a device of the same type is approaching or not. A device according to the invention thus makes it possible to decrease flicker effects due to the use of pulsed signals.

Advantageously and according to the invention, the assisting device is configured to modify the pulsed signal by applying a phase shift thereto.

According to one embodiment of this aspect of the invention, the modification consists only of a phase change and makes it possible to work at a fixed frequency.

Advantageously and according to the invention, the phase-shift value is chosen pseudo-randomly, for example using any generator of pseudo-random values known to those skilled in the art.

According to this aspect of the invention, if an approaching vehicle is equipped with a device of the same type that also uses a phase-shift modification, there is a lower risk of still generating the antiphase and phase effects that would be generated if the two vehicles used the same phase-shift parameters.

Advantageously and according to the invention, the pulsed signal is periodic and of period T.

Advantageously and according to the invention, the average of the pulsed signal during the period T after modification of the signal is the same as the average of the pulsed signal during the same period T before modification of the signal.

According to this aspect of the invention, any modification made to the signal will have no effect on the average value of the relevant quantities. In particular, the average power of the light emission will be constant whatever the modification, thereby making it possible for the driver to benefit from the same luminosity, and for the regulations in terms of illumination to be met.

Advantageously and according to the invention, the assisting device is configured to modify the pulsed signal periodically with a period P.

Advantageously and according to the invention, the period P is equal to a period of synchronization between the illuminating device and the variable transmission screen.

The expression "period of synchronization between the illuminating device and the variable transmission screen" is understood to mean the period between two synchronizations between the illuminating device and the variable transmission screen, ensuring that the illuminating device and the variable transmission screen are controlled synchronously with the pulsed signal.

Advantageously and according to the invention, the period P is equal to the period of synchronization of a protocol used to communicate the signal wirelessly.

Advantageously and according to the invention, the device comprises a control unit suitable for transmitting the pulsed signal to the illuminating device and/or to the variable transmission screen.

Advantageously and according to the invention, the control unit comprises an emitter of remote-control waves able to transmit the pulsed signal to a receiver of the variable transmission screen, the receiver being able to control the transmission coefficient of the variable transmission screen.

Advantageously and according to the invention, the remote-control wave emitter is configured to transmit the pulsed signal using the wireless communication protocol.

Advantageously and according to the invention, the pulsed signal is pulse width modulated (PWM).

Advantageously and according to the invention, the variable transmission screen is formed:
 by the windshield of the vehicle,
 by a screen placed between the windshield of the vehicle and the driver of the vehicle, or
 by a pair of glasses worn by the driver of the vehicle.

The invention also relates to a method for assisting with driving an automotive vehicle, the vehicle being equipped with at least one illuminating device able to emit a beam for illuminating a road scene in front of the vehicle and a variable transmission screen that is intended to be placed between the road scene and a driver of the vehicle, the method comprising a step of synchronously controlling a light emission of at least one light source of the illuminating device and a transmission coefficient of the variable transmission screen with a pulsed signal, wherein the method contains a step of continuously modifying the pulsed signal so as to prevent antiphase and/or phase effects while and if a vehicle implementing a method of the same type is approaching.

A method according to the invention therefore makes it possible to prevent antiphase and phase effects by modifying the pulsed signal whether a vehicle implementing a method of the same type is approaching or not.

Advantageously and according to the invention, the modifying step comprises a step of shifting the phase of the pulsed signal.

Advantageously and according to the invention, the phase-shift value is chosen pseudo-randomly.

Advantageously and according to the invention, the pulsed signal is periodic and of period T.

Advantageously and according to the invention, the average of the pulsed signal during the period T after the modifying step is the same as the average of the pulsed signal during the same period T, before the modifying step.

Advantageously and according to the invention, the modifying step is carried out periodically with a period P.

Advantageously and according to the invention, the period P is equal to a period of synchronization between the illuminating device and the variable transmission screen.

Advantageously and according to the invention, the period P is equal to a period of synchronization of a protocol used to communicate the signal wirelessly.

Advantageously and according to the invention, the assisting method comprises a step of transmitting the pulsed signal to the illuminating device and to the variable transmission screen.

Advantageously and according to the invention, the step of transmitting the pulsed signal is carried out using a wireless communication protocol.

Advantageously and according to the invention, the pulsed signal is pulse width modulated.

The invention also relates to an assisting device and an assisting method that are characterized in combination by all or some of the features mentioned above or below.

These and other objects and advantages of the invention will be apparent from the following description, the accompanying drawings and the appended claims.

BRIEF DESCRIPTION OF THE ACCOMPANYING DRAWINGS

Other aims, features and advantages of the invention will become apparent on reading the following solely nonlimiting description given with reference to the appended figures, in which.

DETAILED DESCRIPTION OF THE PREFERRED EMBODIMENTS

Figure 1:
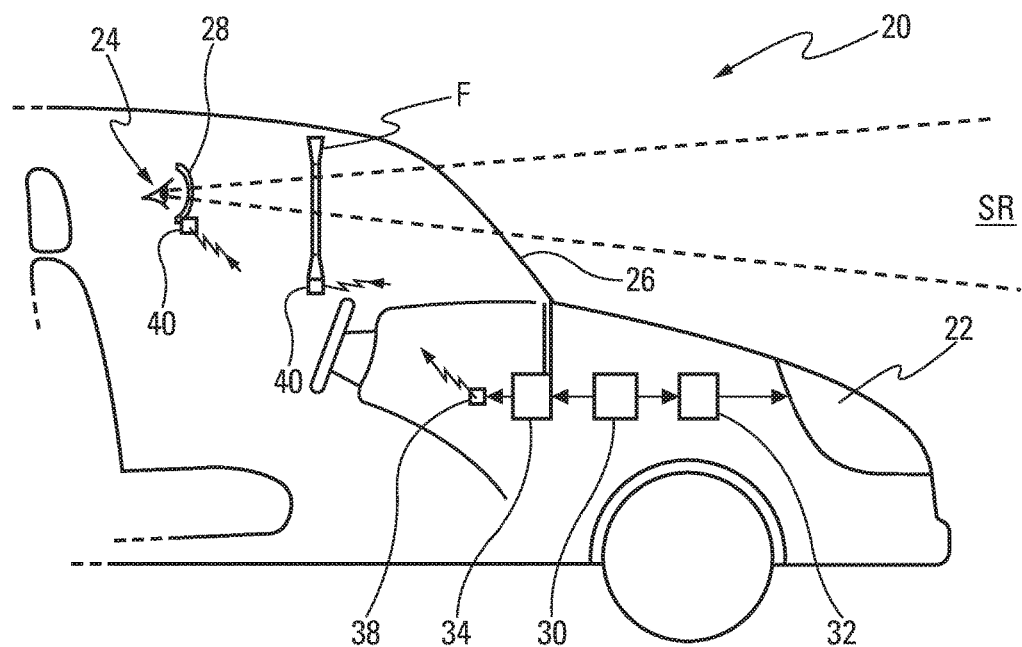
FIG. 1 is a schematic partial cross-sectional view of a vehicle comprising a device according to one embodiment of the invention.

FIG. 1 schematically shows a partial cross section through a vehicle 20 comprising an assisting device according to one embodiment of the invention. The vehicle 20 is, as is conventional, equipped with an illuminating device 22 able to emit a beam for illuminating a road scene SR by virtue of a light source, and is controlled by a driver 24, symbolized by his eye. The road scene SR corresponds to what the driver 24 of the vehicle 20 observes. The driver 24 here observes the road scene SR in front of the vehicle 20 and through the windshield 26.

A variable transmission screen 26, 28, F is placed in the field of view of the driver 24, between the latter and the road scene SR. According to various embodiments of the invention, the variable transmission screen 26, 28, F may consist:
- of an actual screen F placed between the driver 24 and the windshield 26, for example able to be raised in the same way as a sun visor,
- of the windshield 26 itself, or
- of a pair of glasses 28 worn by the driver 24 in a similar way to sunglasses or corrective spectacles, a single lens having been shown in FIG. 1.

These three embodiments have all been shown in FIG. 1, for ease of illustration. They are however only variant embodiments, each of them tending to obtain the same result. In the rest of the description, the term "variable transmission screen" will be used to designate any one of these three embodiments.

Whatever the embodiment, the assisting device, when it is active (i.e. in operation), synchronously controls the transmission coefficient of the variable transmission screen 26, 28, F and the light source of the illuminating device 22 of the vehicle 20. One objective to be achieved thereby is for the transmission coefficient of the variable transmission screen 26, 28, F to be maximum (i.e. for the transparency of the screen to be maximum) when the illuminating device 22 is emitting light, and therefore for the driver 24 to see the road scene SR illuminated by his illuminating device 22. Another objective to be achieved thereby is for the transmission coefficient of the variable transmission screen 26, 28, F to be minimum (i.e. for the transparency of the screen to be minimum) when the illuminating device 22 is not emitting light, and therefore for exterior lights illuminating the road scene SR to be attenuated.

To do this, the assisting device here comprises a control unit 30 that generates a pulsed signal intended for controlling the illuminating device 22 and the variable transmission screen 26, 28, F.

The control unit 30 will possibly be connected to a management circuit 32 that controls the power supply of the illuminating device 22 so that the illuminating device 22 emits a beam of an intensity that varies periodically between a maximum value and a minimum value, varying depending on the pulsed signal.

The control unit 30 will possibly also be connected to a circuit 34 controlling the transmission coefficient, for the transmission of the pulsed signal. If the variable transmission screen 26, 28, F is movable or remote from the control unit 30 (in the case of use of a pair of glasses 28 for example), the pulsed signal may be transmitted via a wireless link, using a given wireless communication protocol, such as, for example, a protocol according to the standard IEEE 802.15.1 and all its extensions (commonly denominated by the registered trademark Bluetooth) or the standard IEEE 802.11 (commonly denominated by the registered trademark Wi-Fi).

If the pulsed signal is transmitted wirelessly from the control unit 30 to the variable transmission screen 26, 28, F, the circuit 34 controlling the transmission coefficient comprises, for example, an emitter 38 of remote-control waves, and the variable transmission screen 26, 28, F is provided, for example, with a receiver 40 of the same remote-control waves. The receiver 40 then controls the variable transmission coefficient of the screen, in the sense that it applies to the variable transmission screen 26, 28, F the set controls corresponding to the pulsed signal.

Figure 2:
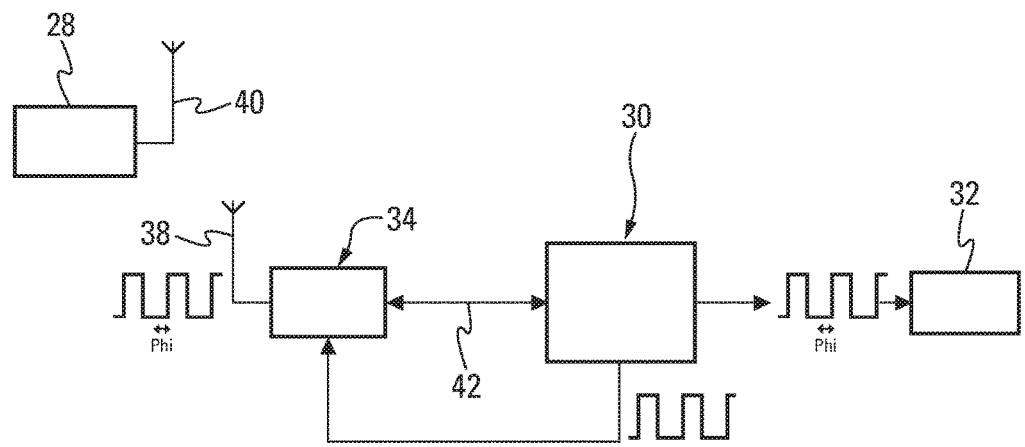
FIG. 2 is a schematic view of the assisting device according to one embodiment of the invention.

FIG. 2 is a schematic view of the assisting device according to one embodiment of the invention employing wireless transmission.

The control unit 30 comprises a microcontroller that delivers a pulsed signal of fixed frequency and zero phase shift. This unmodified pulsed signal is transmitted to the circuit 34 controlling the transmission coefficient. The microcontroller delivers, in parallel, modification parameters, which enable the modification of the pulsed signal according to the invention, here phase-shift parameters, especially by way of a connection 42. The circuit 34 controlling the transmission coefficient applies these parameters to the pulsed signal and transmits via the emitter 38 the modified pulsed signal to the receiver 40 of the variable transmission screen 26, 28, F.

In contrast, the circuit 34 controlling the transmission coefficient may also transmit information to the microcontroller by way of the connection 42.

According to another embodiment (not shown), the microcontroller transmits the pulsed signal modified with the modification parameters directly to the circuit 34 controlling the transmission coefficient.

Likewise, the microcontroller delivers to the management circuit 32 the pulsed signal, either by delivering the unmodified pulsed signal and the modification parameters in parallel, or the modified pulsed signal directly, as shown in FIG. 2.

In this embodiment, the assisting method implemented by the assisting device therefore contains the following steps:
- a step in which the microcontroller creates the pulsed signal,
- a step of modifying the pulsed signal, either carried out directly by the microcontroller or by the circuit 34 controlling the transmission coefficient, which receives the modification parameters from the microcontroller, and
- a step in which the pulsed signal is transmitted, by the emitter 38 of remote-control waves, from the circuit 34 controlling the transmission coefficient to the receiver 40.

It will be noted that transmitting the unmodified pulsed signal to the circuit 34 controlling the transmission coefficient from the control unit 30 makes it possible to ensure synchronizations between the control unit 30 and the variable transmission screen 26, 28, F. This makes it possible to ensure that no shift is created between the pulsed signal that the variable transmission screen 26, 28, F receives and the pulsed signal that the illuminating device 22 receives.

Figure 3:
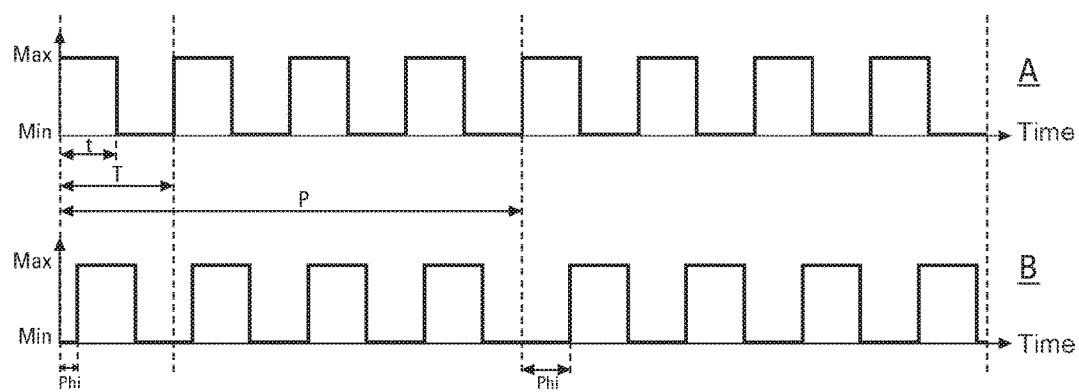
FIG. 3 is a graph of the temporal variation of the pulsed signal before and after modification of the pulsed signal, according to the invention.

FIG. 3 shows the graph of an exemplary temporal variation of the pulsed signal before modification A and after modification B, while the assisting device is active. In this embodiment, the modification consists in a phase shift Phi. The pulsed signal presented here is a periodic signal of period T, the amplitude of which varies between a minimum Min and a maximum Max. Since the pulsed signal is sent both to the variable transmission screen 26, 28, F and to the illuminating device 22, the minimum Min corresponds to the variable transmission screen 26, 28, F having a minimum transmission coefficient and to the illuminating device 22 having its light source turned off. Likewise, the maximum Max corresponds to the variable transmission screen 26, 28, F having a maximum transmission coefficient and to the illuminating device 22 having its light source turned on.

The pulsed signal may be characterized by a duty cycle that is equal to t/T, t corresponding to the time for which the value of the pulsed signal is at its maximum. In FIG. 3, the duty cycle is 0.5, i.e., expressed in percent, 50%. In practice, since the pulsed signal is used to control the transmission coefficient of the variable transmission screen 26, 28, F and the light emission of the illuminating device 22, a duty cycle of 50% corresponds:

- to a Illuminating device 22 emitting light during half a period and not emitting light during the other half: the result is equivalent to a continuous light emission of power equal to half the power emitted during the half period in which the illuminating device 22 emits light; and
- to a variable transmission screen 26, 28, F that has its transmission coefficient at its maximum during a half period (simultaneously with the half period in which the illuminating device 22 emits light) and at its minimum during a half period (simultaneously with the half period in which the illuminating device 22 does not emit light): the result is equivalent to an average transmission coefficient equal to the average of the maximum transmission coefficient and the minimum transmission coefficient.

In order for the system to function advantageously, it is necessary for the modification not to lead to a difference in the average of the pulsed signal over a period T between the pulsed signal before modification A and the pulsed signal after modification B, as this would entail a modification of the power of the illuminating device 22 which could then no longer meet regulatory requirements. In the embodiment shown, it may be seen that the phase shift Phi does not modify the duty cycle or the amplitude of the signal and therefore does not modify the average of the signal during a period T.

The fact that the modification of the pulsed signal is carried out continuously makes it possible to prevent two approaching vehicles from using the same modified pulsed signal at the same time, all this while avoiding any need for inter-vehicle communication or capture of exterior information. Thus, in the embodiment in FIG. 3, the phase shift Phi changes with a period P=4 T. The period P must be short in order to repeat a sufficient number of times during the approach of a vehicle. For example, the phase change may occur on each period T (i.e. P=T), or indeed correspond to the period of synchronization of the emitter 38 of remote-control waves and the receiver 40, to the period of synchronization of the wireless communication protocols or to any other, especially intermediate, value. This synchronization period will possibly correspond to the durations 5 T to 10 T.

The value of the phase shift Phi for each period P may be chosen pseudo-randomly in order to decrease the risk of meeting a vehicle the pulsed signal of which is modified by the same phase shift. The value may also depend on a parameter of the vehicle that will a priori be unique to the vehicle during an approach, such as its speed or rpm. The value may also depend on a mathematical function, for example a linear or triangular function. The chosen value is advantageously positive and comprised between 0 and (1−(t/T))*T, the latter value corresponding to the time for which the pulsed signal has its minimum value during a period T.

Advantageously, the device according to the invention implements the method according to the invention.

Advantageously, the method according to the invention is implemented by the device according to the invention.

Advantageously, the step of transmitting the pulsed signal is implemented by the emitter 38 of remote-control waves of the assisting device according to the invention.

Advantageously, the emitter 38 of remote-control waves of the assisting device according to the invention implements the step of transmitting the pulsed signal of the assisting method according to the invention.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for assisting with driving an automotive vehicle, said vehicle being equipped with at least one illuminating device able to emit a beam for illuminating a road scene (SR) in front of said vehicle, said assisting device comprising a variable transmission screen that is intended to be placed between said road scene (SR) and a driver of said vehicle, said assisting device being configured to, when active, synchronously control a light emission of at least one light source of said at least one illuminating device and a transmission coefficient of said variable transmission screen with a pulsed signal, wherein said assisting device is configured to continuously modify said pulsed signal, while said assisting device is active, so as to prevent antiphase and/or phase effects while and if a vehicle equipped with a device of the same type is approaching;

wherein said assisting device comprises a microcontroller adapted to generate at least one of an unmodified pulsed signal of fixed frequency and zero phase shift or a modified pulsed signal that has been produced in response to modification parameters for controlling said variable transmission screen;

said assisting device further comprising a circuit for: (i) receiving said unmodified pulsed signal and for producing a second modified pulsed signal in response thereto using said modification parameters for controlling said variable transmission screen, and/or (ii) receiving said modified pulsed signal;

wherein said pulsed signal which is received by said variable transmission screen is defined by either said modified pulsed signal generated by said microcontroller or said second modified pulsed signal, generated by said circuit, each of said modified pulsed signal or said second modified pulsed signal is generated in response to said unmodified pulsed signal being continuously modified;

wherein there is no shift created between the pulsed signal received by said variable transmission screen and a pulsed signal generated by said microcontroller for use in energizing said at least one illumination device.

2. The device as claimed in claim 1, wherein said device is configured to modify said pulsed signal by applying a phase shift thereto.

3. The device as claimed in claim 2, wherein the phase-shift value (Phi) is chosen pseudo-randomly.

4. The device as claimed in claim 3, wherein said pulsed signal is periodic and of period T.

5. The device as claimed in claim 3, wherein said assisting device is configured to modify said pulsed signal periodically with a period P.

6. The device as claimed in claim 2, wherein said pulsed signal is periodic and of period T.

7. The device as claimed in claim 2, wherein said assisting device is configured to modify said pulsed signal periodically with a period P.

8. The device as claimed in claim 1, wherein said pulsed signal is periodic and of period T.

9. The device as claimed in claim 8, wherein the average of said pulsed signal during said period T after modification of said pulsed signal is the same as the average of said pulsed signal during said period T before modification of said pulsed signal.

10. The device as claimed in claim 9, wherein said assisting device is configured to modify said pulsed signal periodically with a period P.

11. The device as claimed in claim 8, wherein said assisting device is configured to modify said pulsed signal periodically with a period P.

12. The device as claimed in claim 1, wherein said device is configured to modify said pulsed signal periodically with a period P.

13. The device as claimed in claim 12, wherein said period P is equal to a period of synchronization between said illuminating device and said variable transmission screen.

14. A method for assisting with driving an automotive vehicle, said vehicle being equipped with at least one illuminating device able to emit a beam for illuminating a road scene (SR) in front of said vehicle and an assisting device comprising a variable transmission screen that is intended to be placed between said road scene (SR) and a driver of said vehicle, said method comprising a step of synchronously controlling a light emission of at least one light source of said at least one illuminating device and a transmission coefficient of said variable transmission screen with a pulsed signal, wherein said method comprises the step of continuously modifying said pulsed signal so as to prevent antiphase and/or phase effects while and if a vehicle implementing a method of the same type is approaching;

wherein said assisting device comprises a microcontroller adapted to generate at least one of an unmodified pulsed signal of fixed frequency and zero phase shift or a modified pulsed signal that has been produced in response to modification parameters for controlling said variable transmission screen;

said assisting device further comprising a circuit for: (i) receiving said unmodified pulsed signal and for producing a second modified pulsed signal in response thereto using said modification parameters for controlling said variable transmission screen, and/or (ii) receiving said modified pulsed signal;

wherein said pulsed signal which is received by said variable transmission screen is defined by either said modified pulsed signal generated by said microcontroller or said second modified pulsed signal, generated by said circuit, each of said modified pulsed signal or said second modified pulsed signal is generated in response to said unmodified pulsed signal being continuously modified;

wherein there is no shift created between the pulsed signal received by said variable transmission screen and a pulsed signal generated by said microcontroller for use in energizing said at least one illumination device.

15. The method as claimed in claim 14, wherein said modifying step comprises a step of shifting the phase of said pulsed signal.

16. The method as claimed in claim 15, wherein the phase-shift value (Phi) is chosen pseudo-randomly.

17. The method as claimed in claim 14, wherein said pulsed signal is periodic and of period T.

18. The method as claimed in claim 17, wherein the average of said pulsed signal during said period T after said modifying step is the same as the average of said pulsed signal during said period T before said modifying step.

19. The method as claimed in claim 14, wherein said modifying step is carried out periodically with a period P.

20. The method as claimed in claim 19, wherein said period P is equal to a period of synchronization of said pulsed signal between said illuminating device and said variable transmission screen.

* * * * *